(No Model.)
T. R. JONES.
STREET SWEEPER.
No. 596,329. Patented Dec. 28, 1897.
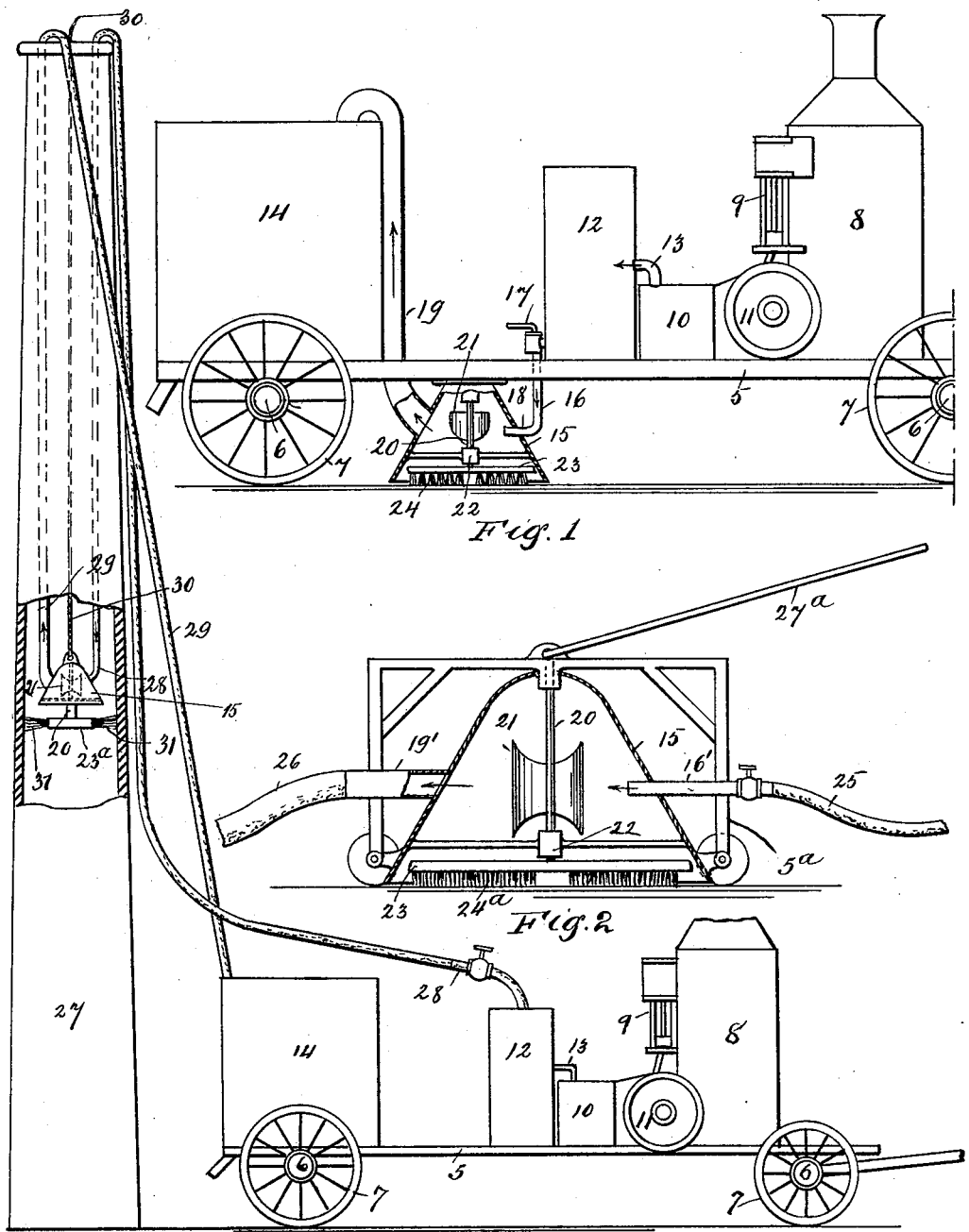
WITNESSES
INVENTOR
Thomas R. Jones.
BY
Edgar Tate & Co.
ATTORNEYS.

UNITED STATES PATENT OFFICE.

THOMAS RICHARD JONES, OF SACRAMENTO, CALIFORNIA.

STREET-SWEEPER.

SPECIFICATION forming part of Letters Patent No. 596,329, dated December 28, 1897.

Application filed March 11, 1897. Serial No. 626,974. (No model.)

*To all whom it may concern:*

Be it known that I, THOMAS RICHARD JONES, a citizen of the United States, residing at Sacramento, in the county of Sacramento and State of California, have invented certain new and useful Improvements in Street-Cleaning Apparatus, of which the following is a full and complete specification, such as will enable those skilled in the art to which it appertains to make and use the same.

This invention relates to street-cleaning apparatus; and the object thereof is to provide an improved apparatus of this class which is simple in construction and operation and which may also be employed for cleaning chimneys and other purposes.

The invention is fully disclosed in the following specification, of which the accompanying drawings form a part, in which—
Figure 1 is a side view of my improved apparatus when employed for cleaning streets, part of the construction being shown in section; Fig. 2, a similar view of a part of the apparatus when employed for cleaning the floors of compartments or buildings, and Fig. 3 a similar view showing the application of my improved apparatus for cleaning chimneys.

In the drawings forming part of this specification the separate parts of my improvement are designated by numerals of reference in each of the views, and in the practice of my invention, reference being made to Fig. 1, I provide a truck which consists of a suitable frame 5, which is supported at each end by axles 6, provided with wheels 7; but this truck may be of any desired form of construction, and in practice I mount thereon at one end thereof a boiler 8, which is provided with an air-pump 9 of any desired form of construction, and with which is connected an air-compressing apparatus 10 and 11 of any suitable construction, and adjacent to this air-compressing apparatus is an air-tank 12, which is in communication therewith by means of a pipe 13 and which is adapted to contain air under a high degree of pressure, and mounted on the opposite end of the truck is a suitable receptacle 14, which is designed to receive the dirt, dust, and other substances removed from the street. It will be understood that the receptacle 14 is either open at the top or provided with openings.

Mounted beneath the truck-frame and between the air-tank 12 and the receptacle 14 is a conical casing 15, the base of which is directed downwardly and open, and the apex of said casing is directed upwardly and closed, and extending from the air-tank 12 and communicating with the said conical casing 15 at one side thereof is an air-pipe 16, which is provided with a valve 17, and the lower end of the air-pipe 16 is provided with an angular extension 18, which projects into the casing 15 transversely thereof, and on the opposite side of said casing is another and larger pipe 19, which communicates with the conical casing 15 opposite the end of the extension 18 of the pipe 16.

Supported within the conical casing 15 is a vertical shaft 20, on which is mounted a blower 21, and the lower end of said shaft 20 passes through a keeper 22 and is provided with a cross-head 23, to the lower part of which is secured a brush 24 of any suitable form and construction.

The cross-head 24 and the brush connected therewith extend almost entirely across the base of the conical casing 15, and the operation of this form of construction will be readily understood from the foregoing description when taken in connection with the accompanying drawings and the following statement thereof.

The tank 12 is first filled with air under a high degree of pressure, and this pressure is maintained by means of the air-pump or compressing apparatus 10 and 11, and in practice when the truck is in motion the valve 17 is opened and the air rushes through the pipe 16 and revolves the fan or blower 21, and this operation also revolves the brush 24, which operates on the surface of the street, and the force of the air carries the dust or dirt up through the tube 19 and deposits it in the receptacle 14, from which it may be removed whenever desired.

The conical casing may be of any desired size, the fan or blower may be of any preferred form and construction, and in Fig. 2 I have shown my improvement applied for the purpose of cleaning the floors of buildings and compartments, and in this form I employ a truck or frame 5ª, in which the conical casing 15 is mounted, and said casing is provided with the shaft 20, the fan or blower 21, and the cross-head 23 and brush 24ª. I also employ the compressed-air pipe 16' and the pipe 19'; but in this form of construction the air-pipe 16' is provided with a flexible tube 25, which is connected with any suitable air-compressor or with an air-tank filled with air under pressure, and the pipe 19' is also provided with a flexible tube or pipe 26, which in practice is connected with a suitable receptacle, and the frame or truck in which the conical casing 15 is mounted is provided with a bail or handle 27ª, by which it may be moved around over the floor to be cleaned, and the operation of this form of construction will be substantially the same as that hereinbefore described.

In Fig. 3 I have shown my improved apparatus applied for cleaning chimneys, and in this form of construction I employ the truck shown in Fig. 1, the boiler 8, the air-compressing apparatus, the air-tank 12, and the receptacle 14, and in Fig. 3 I have shown a chimney 27, and in practice I connect with the air-tank 12 a long flexible tube 28 and with the receptacle 14 a similar flexible tube 29, and I also employ the conical casing 15, which is suspended in the chimney by a cord 30, by means of which the conical casing 15 may be raised and lowered, and the flexible tube 28 communicates with one side of said conical casing and the flexible tube 29 with the other side, and the conical casing 15 is provided with the central vertical shaft 20, which is provided with the fan or blower 21 and with the cross-head 23ª, and said cross-head is provided at its ends with separate brushes 31, and in this form of construction the cross-head 23ª is revolved by the air which passes through the tube 28, and a portion of the dust or dirt within the chimney is forced through the conical casing 15 and through the tube 29 and back into the receptacle 14. In this form of construction the brushes 31 operate upon the inner walls of the chimney to remove the soot, dust, and dirt therefrom, and this apparatus is also simple in construction and operation, and it will be apparent that the casing 15 may be raised and lowered in the chimney by the cord 30.

Having fully described my invention, I claim as new and desire to secure by Letters Patent—

1. An apparatus for sweeping streets, cleaning floors, and for other purposes, the same consisting of a truck or frame, an air-tank which is adapted to receive air under pressure, a suitably-supported conical casing, the base of which is directed downwardly and open, and the apex of which is directed upwardly and closed, a vertical shaft mounted in said casing, a fan or blower mounted thereon, a brush connected transversely with the lower end of said shaft, and a pipe which extends into one side of said casing, and which is in communication with said air-tank, and another pipe which communicates with said conical casing on the opposite side thereof, substantially as shown and described.

2. An apparatus for sweeping streets, cleaning floors, and for other purposes, the same consisting of a truck or frame, an air-tank which is adapted to receive air under pressure, a suitably-supported conical casing the base of which is directed downwardly, and open, and the apex of which is directed upwardly and closed, a vertical shaft mounted in said casing, a fan or blower mounted thereon, a brush connected transversely with the lower end of said shaft, and a pipe which extends into one side of said casing, and which is in communication with said air-tank, and another pipe which communicates with said conical casing on the opposite side thereof, and an opened-top receptacle mounted on said truck and said last-named pipe being in communication with said receptacle, substantially as shown and described.

In testimony that I claim the foregoing as my invention I have signed my name, in presence of the subscribing witnesses, this 27th day of February, 1897.

THOMAS RICHARD JONES.

Witnesses:
 ERASTUS HOLDEN,
 GEORGE VERNON WATSON.